US009510306B2

(12) United States Patent
Yang et al.

(10) Patent No.: US 9,510,306 B2
(45) Date of Patent: Nov. 29, 2016

(54) METHOD AND SYSTEM FOR COEXISTENCE OF MULTIPLE COLLOCATED RADIOS

(75) Inventors: Xue Yang, Arcadia, CA (US);
Yongfang Guo, Sunnyvale, CA (US);
Xingang Guo, Portland, OR (US);
Ulun Karacaoglu, San Diego, CA (US)

(73) Assignee: INTEL CORPORATION, Santa Clara, CA (US)

( * ) Notice: Subject to any disclaimer, the term of this patent is extended or adjusted under 35 U.S.C. 154(b) by 436 days.

(21) Appl. No.: 13/976,996

(22) PCT Filed: Dec. 27, 2011

(86) PCT No.: PCT/US2011/067414
§ 371 (c)(1),
(2), (4) Date: Jun. 27, 2013

(87) PCT Pub. No.: WO2013/100910
PCT Pub. Date: Jul. 4, 2013

(65) Prior Publication Data
US 2014/0185494 A1    Jul. 3, 2014

(51) Int. Cl.
*H04W 56/00*    (2009.01)
*H04W 88/06*    (2009.01)

(52) U.S. Cl.
CPC ..... *H04W 56/0005* (2013.01); *H04W 56/0015* (2013.01); *H04W 88/06* (2013.01)

(58) Field of Classification Search
CPC ........... H04W 88/06; H04W 72/1215; H04W 72/082
USPC ................. 370/280, 336, 329, 252, 311, 278
See application file for complete search history.

(56) References Cited

U.S. PATENT DOCUMENTS

| | | | |
|---|---|---|---|
| 2005/0239435 A1* | 10/2005 | Ikeda et al. | 455/403 |
| 2006/0135076 A1 | 6/2006 | Honkanen et al. | |
| 2008/0247445 A1 | 10/2008 | Guo et al. | |
| 2009/0028115 A1 | 1/2009 | Hirsch | |
| 2009/0054009 A1* | 2/2009 | Yang et al. | 455/78 |
| 2010/0027525 A1* | 2/2010 | Zhu | 370/350 |

(Continued)

FOREIGN PATENT DOCUMENTS

KR    10-2000-0036215 A    6/2000

OTHER PUBLICATIONS

Office Action received for Japanese Patent Application No. 2014-548773, mailed Apr. 21, 2015, 6 pages including 3 pages English translation.

(Continued)

*Primary Examiner* — Jamal Javaid

(57) ABSTRACT

An apparatus may include a set of transceivers comprising three or more transceivers each operable to communicate via a wireless communications standard different from each other transceiver and a driver to output an enable signal when a first transceiver of the set of transceivers is active. The apparatus may also include a processor circuit and a real-time frame synchronization module operable on the processor circuit to receive a first frame synchronization input signal to delineate first receive and first transmit periods of a radio frame of a first transceiver of the set of transceivers, and to generate a frame synchronization signal to align receive and transmit periods of each of a multiplicity of additional transceivers of the set of transceivers to the respective first receive and first transmit periods of the first transceiver. Other embodiments are disclosed and claimed.

20 Claims, 11 Drawing Sheets

(56) References Cited

U.S. PATENT DOCUMENTS

| | | |
|---|---|---|
| 2010/0046498 A1 | 2/2010 | Hall |
| 2010/0265856 A1 | 10/2010 | Yang |
| 2010/0329231 A1 | 12/2010 | Sekiya et al. |
| 2011/0097998 A1* | 4/2011 | Ko ................... H04W 72/1215 455/41.2 |
| 2011/0144803 A1* | 6/2011 | Egawa ......................... 700/245 |

OTHER PUBLICATIONS

International Search Report and Written Opinion, Mailed Date: May 30, 2012, Application No. PCT/US2011/067414, Filed Date: Dec. 27, 2011, pp. 9.

Extended European Search Report received for European patent Application No. 11878558.3, mailed Jul. 8, 2015, 7 pages.

Decision to Grant received for Japanese Patent Application No. 2014-548773, mailed Nov. 30, 2015, 3 pages (untranslated).

* cited by examiner

METHOD AND SYSTEM FOR COEXISTENCE OF MULTIPLE COLLOCATED RADIOS

BACKGROUND

Multi-radio platforms are wireless communication devices with co-located transceivers that typically communicate using two or more different communication protocols. In the present day, multi-radio platforms may include such devices as cellular telephones, smart phones, tablet computers, personal digital assistants, personal computers, laptop computers, and notebook computers, among others. One issue with multi-radio platforms is that interference between reception and transmission of the co-located transceivers may result in packet corruption or loss from collisions between signals associated with different radios, which therefore may degrade the communication abilities of the radios when two or more radios are simultaneously active. This is especially a concern in multi-radio platforms that include a Worldwide Interoperability for Microwave Access (WiMax) transceiver or a 3GPP long term evolution (LTE) transceiver, when located together a Bluetooth (BT) transceiver, and an IEEE 802.11 (WiFi) transceiver on the same platform because their frequency spectra can overlap or be mutually adjacent.

The frequency range for communications of wireless terminals based upon the Worldwide Interoperability for Microwave Access (WiMax) or the 3GPP Long Term Evolution (LTE) may include bands adjacent to the 2.4-2.5 GHz Industrial, Scientific, and Medical band (ISM band), which places the frequency range of LTE or WiMAX radios adjacent to the range employed by WiFi, and Bluetooth radios.

Thus, present day multi-radio terminals may include three or more collocated radios that occupy mutually overlapping or adjacent frequency ranges. At present, systems and methods for addressing interference problems that may occur in such multi-radio devices are insufficient.

It is with respect to these and other considerations that the present improvements have been needed.

DETAILED DESCRIPTION

Figure 1:
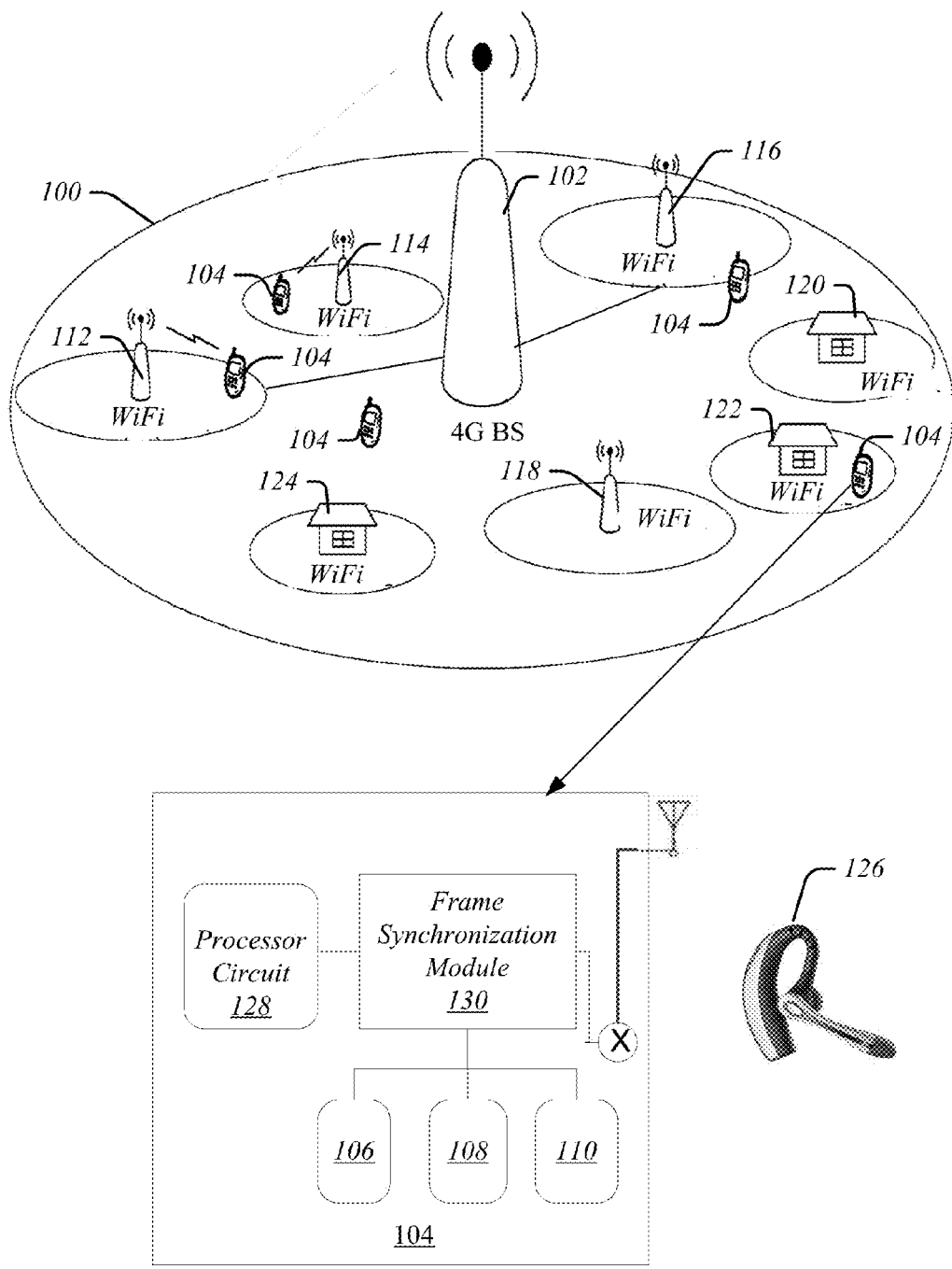
FIG. 1 depicts a scenario for operation of a multi-radio platform consistent with the present embodiments.

Some embodiments of a communications system may be implemented with a radio technology such as the Institute of Electrical and Electronics Engineering (IEEE) 802.16 (WiMAX), IEEE 802.11 (WiFi), IEEE 802-20, the 3rd Generation Partnership Project (3GPP) Evolved Universal Mobile Telecommunication System (UMTS) Terrestrial Radio Access (UTRA) (E-UTRA), among others. IEEE 802.16m is an evolution of IEEE 802.16e, and provides backward compatibility with an IEEE 802.16-based system. The UTRA is a part of UMTS. The 3GPP long term evolution (LTE) is a part of an evolved UMTS (E-UMTS) using the E-UTRA. LTE-advance (LTE-A) is an evolution of the 3GPP LTE. As used herein, any reference to the term "LTE" includes any version of LTE, including LTE-A and its revisions, progeny, and variants. Embodiments may also be implemented using Bluetooth®, or other wireless local radio communication standards.

Recently, advanced versions of the WiMAX and 3GPP LTE standards have adopted or been accorded the moniker "4G". In particular, the international telecommunication union radio communication sector (ITU-R) recognized that current versions of LTE, WiMax and other evolved 3G technologies that may not fulfill "IMT-Advanced" requirements could nevertheless be considered "4G", provided they represent forerunners to IMT-Advanced and "a substantial level of improvement in performance and capabilities with respect to the initial third generation systems now deployed. Accordingly, as used herein, the term "4G" may generally refer to more advanced generations of WiMAX, such as 802.16e and successors, or 3GPP LTE release 8 and successors. However, the term "4G" may generally refer to any high speed wireless wide area network radio communications standard that employs a time division duplex communications.

Various embodiments are directed to improving communications in platforms that include at least three different radios. The term "platform" may include wireless portable devices that may also be known as stations, mobile terminals, UE, and by other terms. The term "platform" may also include wireless computers, hybrid communication devices, entertainment devices, and the like, whether or not such devices are typically used as portable devices or stationary devices. In particular, embodiments are related to facilitating so-called 3-way coexistence issues in which three different collocated radios exist within a platform and when two or more of the radios may be active at various periods of time. Some embodiments improve coexistence among co-located WiFi, Bluetooth and 4G time division duplex (TDD) broadband wireless radios. The TDD technique separates uplink and downlink communications into different time slots such where the carrier frequency for uplink and downlink communications may overlap or be the same. Accordingly, TDD techniques avoid collisions by separating uplink and downlink communications in time. Examples of 4G TDD techniques include such as TD-LTE or WiMAX, which both may be deployed close to the ISM band (e.g., 2.3~2.4 GHz or 2.5~2.7 GHz band) as noted above. In the absence of the apparatus and techniques of the present embodiments, when any one of three co-located radios transmits, the transmission can cause substantial interference to the other two co-located radios and prevent them from receiving communications correctly.

Without requiring any filtering or significant reconfiguration of radio transceiver design, the present embodiments provide improvements that allow all three radios (e.g., Bluetooth, WiFi and 4G radios) to coexist with each other in a single platform. Moreover, the present embodiments do not affect the network operations of wireless wide area networks related to a 4G radio component of a multi-radio platform, and can support common usages for both Bluetooth radio and WiFi radios at the same time. Additionally, the present embodiments facilitate coexistence among any two radios in a platform containing three or more radios, during periods when only two radios are active.

Recent investigations have established that when WiFi, Bluetooth and 4G (i.e., LTE 4G or WiMAX 4G) radios are located on the same device destructive interference between them can occur due to such effects as out-of-band emission (OOB) or receiver blocking, among others. Such interference has been confirmed through various measurements with Bluetooth and WiFi radios operating in the ISM band and with 4G radios employing 2.3~2.4 GHz or 2.5~2.7 GHz spectrum. The present embodiments address such scenarios and may in particular facilitate use of multi-radio platforms that employ WiFi, Bluetooth and 4G radios in environments in which all three radios may be active simultaneously.

In one embodiment, for example, a device may comprise a set of transceivers comprising three or more transceivers each operable to communicate via a wireless communications standard different from each other transceiver. The device may further comprise a driver to output an enable signal when a first transceiver of the set of transceivers is active, the enable signal to cause the first transceiver to output a first frame synchronization input signal. The device may also comprise a real-time frame synchronization module operable on a processor circuit to receive the first frame synchronization input signal to delineate first receive and first transmit periods of a radio frame of the first transceiver, and generate a frame synchronization signal to align receive and transmit periods of each of a multiplicity of additional transceivers of the set of transceivers to the respective first receive and first transmit periods of the first transceiver, the alignment to reduce interference between communications of the first transceiver and communications of the multiplicity of additional transceivers. In other words, the alignment may reduce destructive interference between communications of the first transceiver and communications of the multiplicity of additional transceivers caused by out-of-band (OOB) emissions or receiver blocking (e.g., simultaneous transmission of one transceiver while another transceiver is receiving communications). In this manner, the alignment allows substantially simultaneous transmission or substantially simultaneous reception between the first transceiver and the multiplicity of additional transceivers. Other embodiments are described and claimed.

FIG. 1 depicts one scenario in which a multi-radio terminal 104 is deployed within a region 100 that includes heterogeneous radio devices including a wireless wide area base station 102, which may be part of a radio access network that provides 4G communications between base station 102 and wireless devices. The multi-radio terminal 104 may, but need not be, a portable device that can be conveniently moved among various locations. In the scenario of FIG. 1, the multi-radio terminal 104 may communicate with a base station 102 using a 4G radio 106 when located within the region 100, which may be the communications range of the base station 102 using the 4G radio standard, such as WiMAX or LTE-A. As illustrated, multi-radio terminal 104 also includes a WiFi radio 108 and BT radio 110. The WiFi radio 108 may be used to communicate with public WiFi access points (AP) 112, 114, 116, 118 when the multi-radio terminal is within a communications range of the respective APs. The WiFi radio 108 may further be used to communicate with home APs 120, 122, 124. In addition, the BT radio may communicate with external radio devices including BT components, such as a BT headset 126.

Consistent with some embodiments, the 4G radio 106 may be used to provide internet access. At the same time, the co-located WiFi radio 108 may serve as a hotspot of a personal area network (PAN), streaming video to a TV (not shown), while an audio signal is streamed to a Bluetooth speaker or headset. In such case, all three radios 106, 108, 110 may maintain active connections to their respective networks at the same time. In order to provide a coexistence solution that enables the concurrent operations of the three radios 106, 108, 110 (e.g., WiFi, Bluetooth and 4G radios), the multi-radio platform 104 may include a processor circuit 128 and frame synchronization module 130. As detailed below, the frame synchronization module 130 may be operable on the processor circuit 128 to reduce circumstances where simultaneous transmission from a first radio of the radios 106, 108, 110 takes place when a second and/or third radio are receiving communications. In this manner, the communications integrity of communications with all three radios may be maintained at a high level. It is to be noted that simultaneous transmission of packets from any two or three of the multiple co-located radios 106, 108, 110 is generally not problematic in that packet transmission at a given radio may not be affected by simultaneous packet transmission from a nearby collocated radio. Similarly, packet reception at a given radio may generally be unaffected by simultaneous packet reception at a nearby collocated position. Accordingly, the frame synchronization module 130 may act to schedule transmission periods of a first active radio to coincide with transmission periods of any other active radio(s) in multi-radio platform 104. In addition, the frame synchronization module 130 may act to schedule reception periods of a first active radio to coincide with reception periods of any other active radio(s) in multi-radio platform 104.

Figure 2:
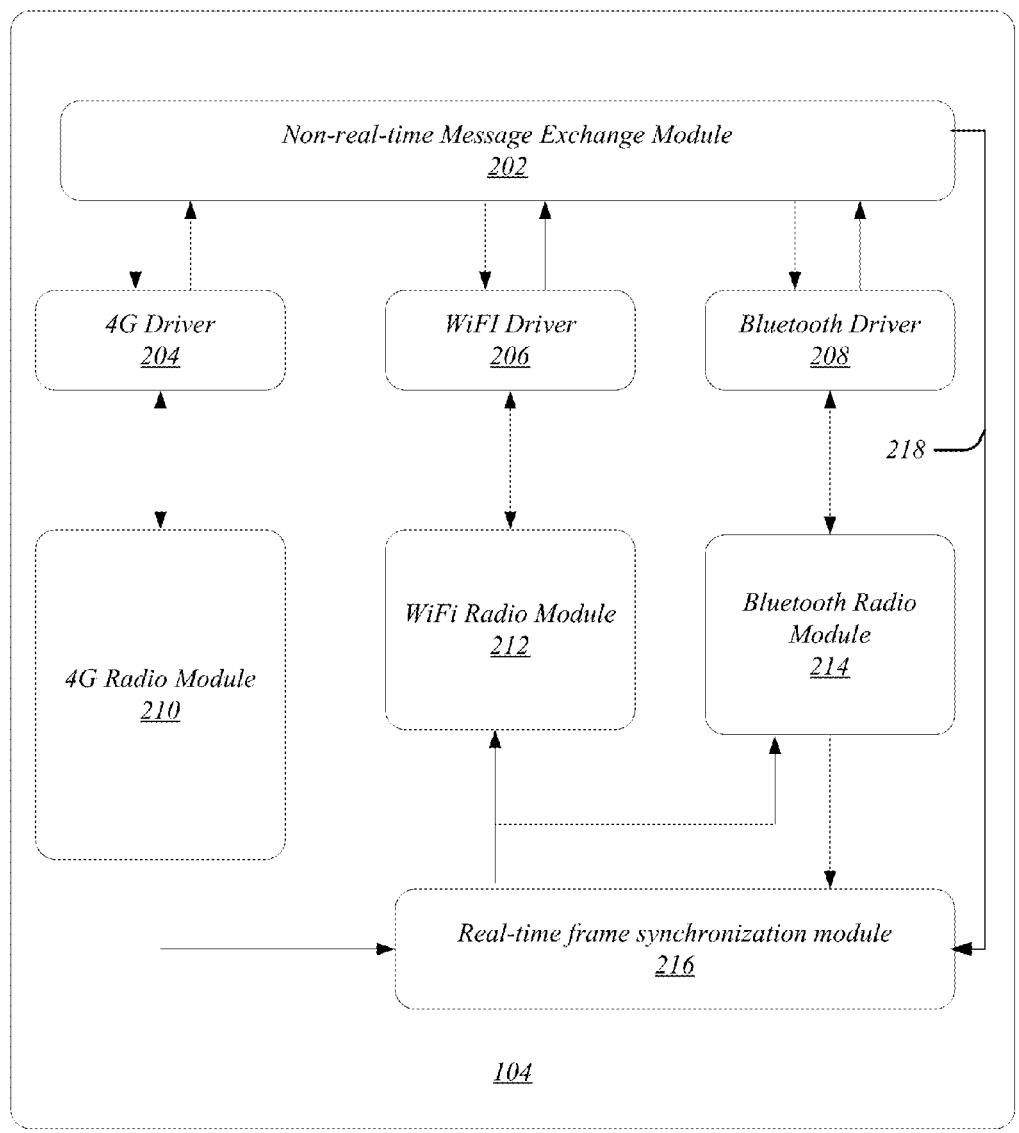
FIG. 2 depicts an embodiment of a multi-radio platform.

FIG. 2 depicts details of a multi-radio platform 102 consistent with further embodiments. The multi-radio platform 102 may include a non-real-time message exchange module 202, which may coordinate exchange of information between various radios within the multi-radio platform 102. The information may include, for example, frame structure information for communications employed by a particular radio. The non-real time message exchange module 202 may be used to exchange the active state of each radio, the frame duration, the downlink/uplink (DL/UL) ratio, etc.

The multi-radio platform also includes a 4G driver 204, a WiFi driver 206, and Bluetooth driver 208. Each driver may include one or more programs to control operation of its respective radio.

As depicted, each driver is coupled to a respective radio module: the 4G driver 204 is coupled to 4G radio module 210; the WiFi driver 206 is coupled to the WiFi radio module 212; and the Bluetooth driver 208 is coupled to the Bluetooth radio module 214. Each radio module, in turn, is coupled to a real-time frame synchronization module 216, which is an example of the frame synchronization module 130 described with reference to FIG. 1. As illustrated, the 4G radio module 210 may be arranged to output signals to a real-time frame synchronization module 216. As discussed below, such signals may be used to coordinate transmission/reception with other radios. The Bluetooth radio module 214 may be arranged to output signals to the real-time frame synchronization module 216 to coordinate operation with the WiFi module 212. The Bluetooth radio module 214 may also be arranged to receive signals from the real-time frame synchronization module 216, which may coordinate operation between the 4G radio module 210 and Bluetooth radio module 214. As also illustrated at FIG. 2, the WiFi radio module 212 may be arranged to receive signals from the real-time frame synchronization module 216, which may result from signals sent from the 4G radio module 210 or Bluetooth module 214, and may be used to coordinate WiFi radio operation with one or more of the other radio modules. The real-time frame synchronization module 216 may also be linked to the non-real time message exchange module 202 via link 218.

Figure 3:
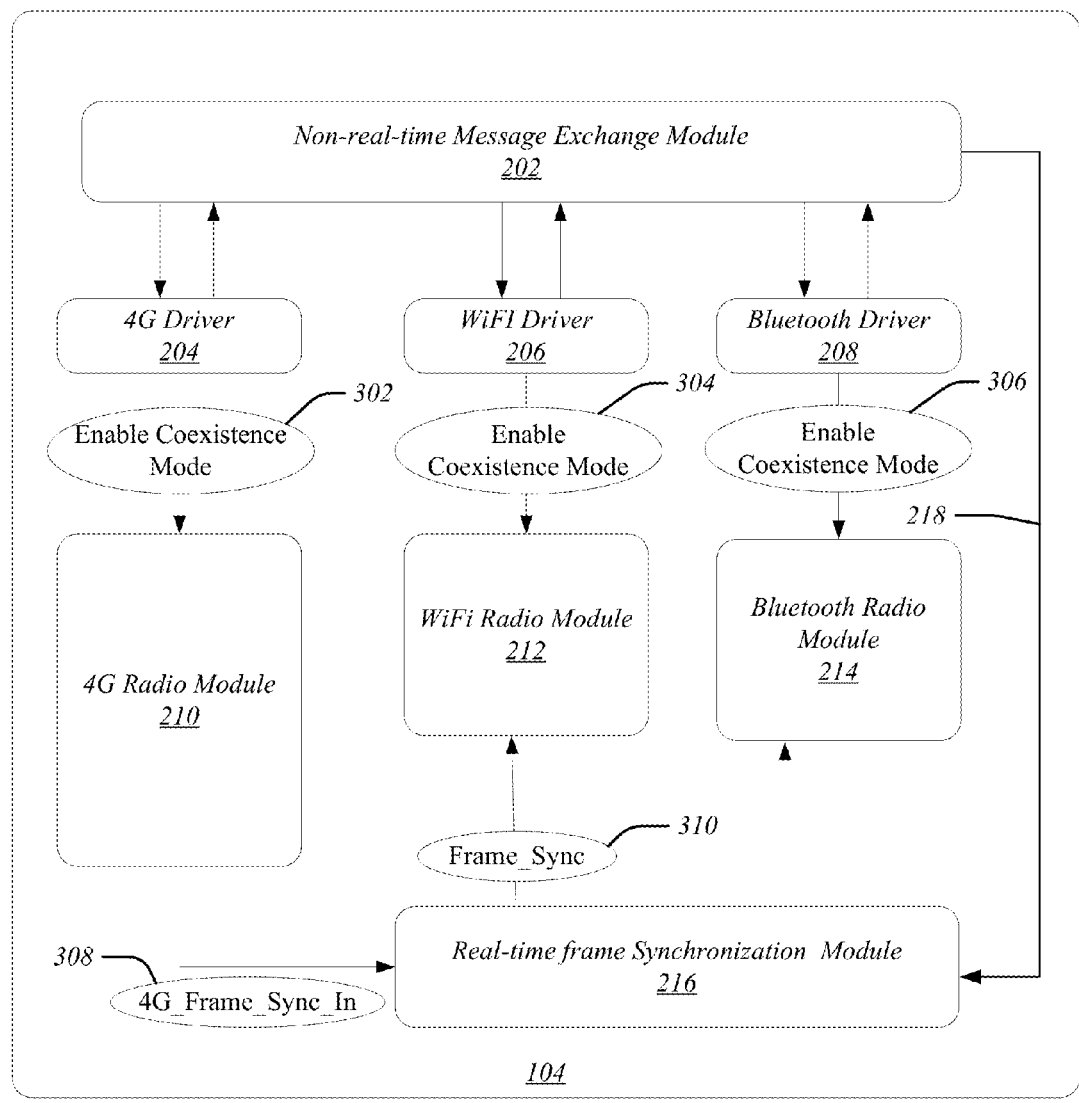
FIG. 3 depicts one scenario of signaling of synchronization of multiple radios consistent with various embodiments.

FIG. 3 depicts one scenario of signaling for synchronization of multiple radios consistent with various embodiments. As illustrated, the 4G driver 204 may transmit an enable coexistence mode message 302 to the 4G radio module 210. The enable coexistence mode message 302 may be sent during a period when the 4G radio module 210 is active and other radio modules are active or expected to be active. When the 4G radio module 210 is active, a circuit (not separately shown) in 4G radio module 210 may schedule reception and transmission of communications according to the 4G frame structure employed by 4G radio module 210, which may be a period of 5 milliseconds (ms) or 10 ms, for example. When the 4G radio module 210 receives the enable coexistence mode message 302, the 4G radio module 210 may also be triggered to generate a signal to delineate the 4G frame structure currently being employed by the 4G radio module 210. The signal may be output as a 4G_Frame_Sync_in signal 308 to the real-time frame synchronization module 216. This, in turn, may trigger output of a frame_sync message 310 from the real-time frame synchronization module 216.

Figure 4:
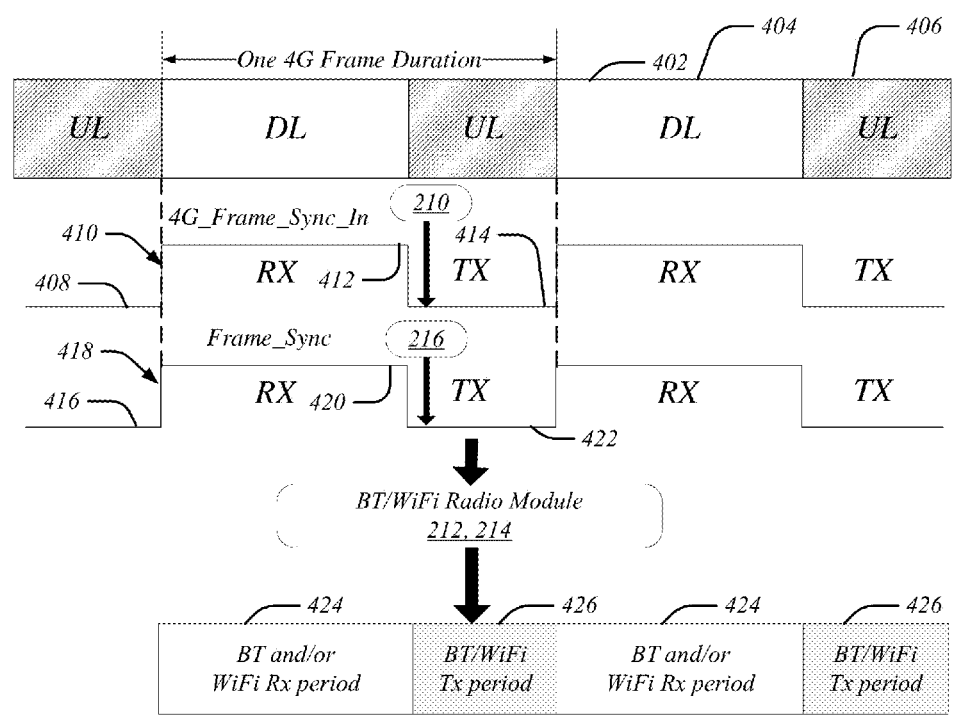
FIG. 4 depicts operation of a real-time frame synchronization module in accordance with various embodiments.

FIG. 4 depicts operation of the real-time frame synchronization module 216 in accordance with various embodiments. In the example of FIG. 4, a 4G frame structure exhibits a series of regularly repeating 4G frames 402. In various embodiments, these frames may be WiMAX or 3GPP LTE frames, among other types of frames. In various embodiments, the frame structure may be arranged according to TDD procedures where uplinks and downlinks are scheduled at mutually different times. In one example, the 4G frames 402 may be a LTE or WiMAX frame having a repeating period of 5 ms. Each 4G frame 402 includes a downlink (DL) portion 404 and uplink (UL) portion 406. For the purposes of illustration, in the example shown, a single downlink portion 404 is followed by a single uplink portion 406 in each 4G frame 402. In the example shown in FIG. 4, the downlink portion 404 is longer than the uplink portion 406.

As further shown in FIG. 4, the 4G radio module 210 may generate a frame synchronization input signal (shown as 4G_frame_sync_in) 408, which is derived from the frame structure of frame 402. In particular, the frame synchronization input signal 408 includes a reference time 410, which may correspond to the instance in time marking the beginning of a 4G frame 402, as shown. The frame synchronization input signal 408 also includes a period of high signal (termed an "RX portion") 412, whose duration may correspond to the duration of downlink period 404 of the 4G frame 402. The frame synchronization input signal 408 also includes a period of low signal (termed a "TX portion") 414, whose duration may correspond to the duration of uplink period 406 of the 4G frame 402. However, in other implementations, a high signal of the frame synchronization input signal may correspond to an uplink period and a low signal may correspond to a downlink period. In various other embodiments, the frame synchronization input signal may provide any convenient form that provides timing to delineate periods for receiving and periods for transmitting.

The frame synchronization input signal 408 may be used to synchronize operation of other radios with the 4G frame 402 in the following manner.

The reference time 410 may be used to align the clock/slot boundary for the Bluetooth module 214 or WiFi radio module 212. The RX portion 412 and TX portion 414 may be used to set respective receive and transmit periods for radio frames generated by WiFi radio module 212 and/or Bluetooth radio module 214. In the embodiment illustrated in FIG. 4 a high signal portion of the frame synchronization input signal 408 may be used to indicate the receive period, while a low signal portion of the frame synchronization input signal 408 may be used to indicate the transmit period.

In various embodiments, the cycle period of the frame synchronization input signal 408, corresponding to one RX portion 412 and one TX portion 414, may be a multiple of 625 μs, which corresponds to one slot duration for conventional Bluetooth communications. In this manner, the duration of a cycle period of frame synchronization input signal 408 may correspond to an integral number of Bluetooth slots, and thus may be used to align timing of communications in the 4G radio and a Bluetooth radio in a convenient fashion.

As illustrated, the frame synchronization input signal 408 may be received by the real-time frame synchronization module 216. The real-time frame synchronization module 216 may determine that one or more radios besides the 4G radio module 210 is active, in which case a frame synchronization signal 416 may be output as illustrated. Consistent with various embodiments, the real-time frame synchronization module 216 may output the frame synchronization signal 416 as a copy of the frame synchronization input signal 408, such that a reference time 418 corresponds to reference time 410 of the frame synchronization input signal 408, and an RX portion 420, having the same duration as RX portion 412 is adjacent to the reference time 418, followed by a transmit portion 422, having the same duration as TX portion 414. Alternatively, the output signal 416 of the real-time frame synchronization module 216 may also be a variation of the frame synchronization input signal 408. For example, the output frame synchronization signal 416 can be a time shifted version of the input signal 408 in which the reference time 418 is provided at a fixed offset in time from reference time 410, where a "0" fixed offset corresponds to the output frame synchronization signal being coincident with the frame synchronization input signal 408.

As shown FIG. 4, the frame synchronization signal 416 may be received by the Bluetooth radio module 214 and/or WiFi radio module 212. Once received, the frame synchronization signal 416 may cause the receiving radio module to adjust its communications according to the information provided in the frame synchronization signal 416. In particular, the frame synchronization signal 416 may delineate the current 4G frame structure according to variations in the signal level, and the duration of the signal at each signal level. For example, as previously noted, the signal high portion of the frame synchronization signal 416, corresponding to the RX portion 420, may be (correctly) interpreted to delineate an Rx period for the respective WiFi/BT radio module, and the signal low portion of the frame synchronization signal 416, corresponding to the TX portion 420, may be interpreted as delineating a TX period. The WiFi radio module 212 and/or BT radio module 214 may then schedule their communications according to a pattern of Rx periods 424 that alternate with TX periods 426 in synchronization with the respective RX periods 420 and TX periods 422 of the frame synchronization signal 416. In this manner, transmission/receptions from/to transceivers of the WiFi radio module 212 and/or BT radio module 214 may align with transmissions/receptions from/to the 4G radio module 210.

Figure 5:
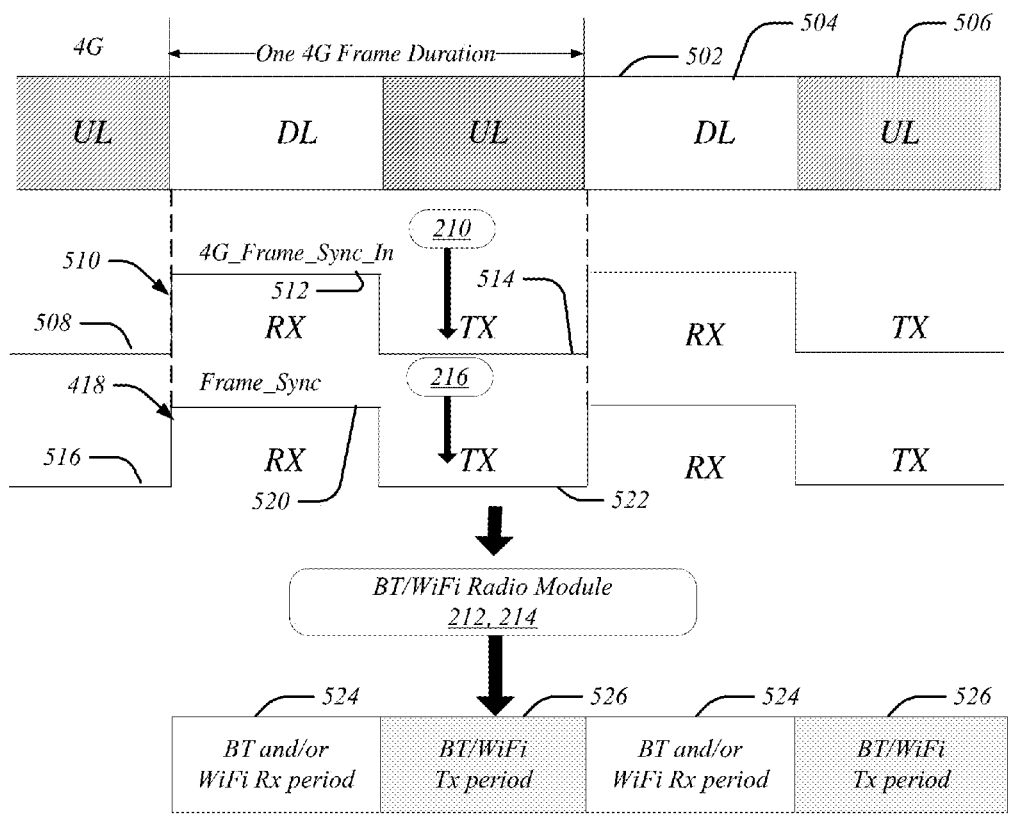
FIG. 5 depicts operation of a real-time frame synchronization module in accordance with various additional embodiments.

FIG. 5 depicts operation of the real-time frame synchronization module 216 in accordance with various additional embodiments. In the example of FIG. 5, one difference from the operation depicted in FIG. 4 is that the 4G frame structure for a frame 502 exhibits a different relative duration for uplinks 504 and downlinks 506 as compared to the 4G frame structure of FIG. 4. In this case, the duration of uplinks 504 and downlinks 506 may be the same as one another.

Thus, the 4G radio module 210 may generate a frame synchronization input signal (shown as 4G_frame_sync_in) 508, which is derived from the frame structure of frame 502. In this case, the frame synchronization input signal 508 includes a reference time 510, which may correspond to the instance in time marking the beginning of a 4G frame 502, as shown. The frame synchronization input signal 508 also includes an RX portion 512, whose duration may correspond to the duration of downlink portion 504 of the 4G frame 502. The frame synchronization input signal 508 also includes a TX portion 514, whose duration may correspond to the duration of uplink portion 506 of the 4G frame 502.

As with the scenario of FIG. 4, the frame synchronization input signal 508 may be used to synchronize operation of other radios with the 4G frame 502 in the following manner. The reference time 510 may be used to align the clock/slot boundary for Bluetooth module 514 or WiFi radio module 512. The RX portion 512 and TX portion 514 may be used to set respective receive and transmit periods for radio frames generated by WiFi radio module 512 and/or Bluetooth radio module 514.

As illustrated, the frame synchronization input signal 508 may be received by the real-time frame synchronization module 216, which may determine that one or more radios besides the 4G radio module 210 is active and may accordingly output the frame synchronization signal 516. Consistent with various embodiments, the real-time frame synchronization module 216 may output the frame synchronization signal 516 as a copy of the frame synchronization input signal 508, such that a reference time 518 corresponds to reference time 510 of the synchronization input signal 508, and an RX portion 520, having the same duration as RX portion 512 is adjacent to the reference time 518, followed by a transmit period 522, having the same duration as TX portion 514. Alternatively, the output signal 516 of the real-time frame synchronization module 216 may also be a variation of the frame synchronization input signal 508. For example, the output signal 516 can be a time shifted version of the input signal 508.

As shown in FIG. 5, once the frame synchronization signal 516 is received by a WiFi/BT radio module 212/214, the frame synchronization signal 516 may cause the receiving radio module to adjust its communications according to the information provided in the frame synchronization signal 516, as detailed above with respect to FIG. 4. The WiFi radio module 212 and/or BT radio module 214 may then generate a pattern of RX periods 524 that alternate with TX periods 526 in synchronization with the respective RX periods 520 and TX periods 522 of the frame synchronization signal 516.

In this manner, transmission and reception from/to transceivers of the WiFi radio module 212 and/or BT radio module 214 may align with transmission and reception from/to the 4G radio module 210, as controlled by 4G frame 502.

Figure 6:
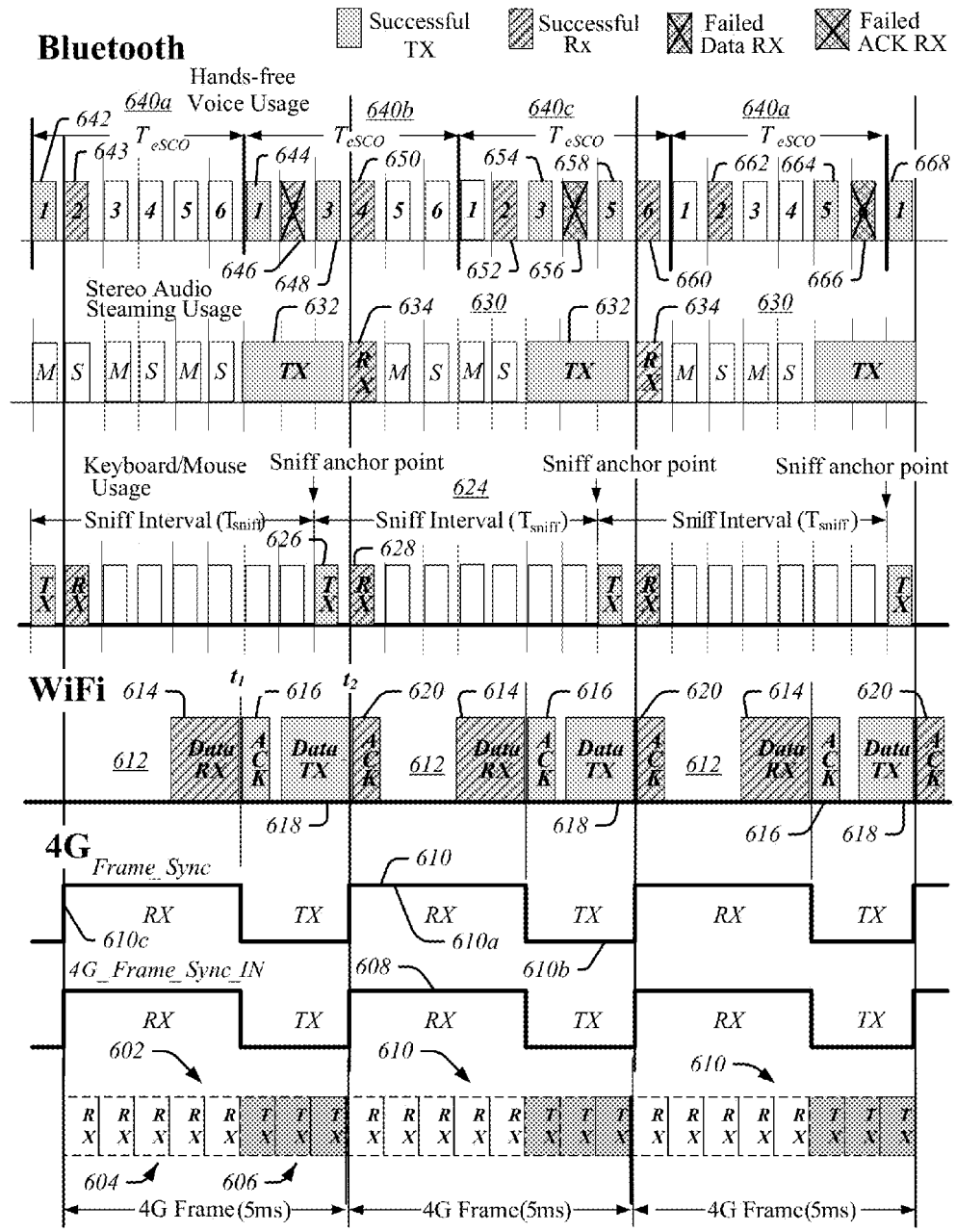
FIG. 6 depicts details of frame synchronization for three different collocated radios consistent with some embodiments.

FIG. 6 depicts details of frame synchronization for three different collocated radios consistent with some embodiments. In particular, FIG. 6 depicts synchronization of a 4G radio with a WiFi radio and with a BT radio for different use cases of a BT radio. As illustrated, a 4G radio frame (or frame) 602 may be generated that has a duration of 5 ms. The exemplary 4G radio frame 602 is characterized by having downlink (i.e., RX) periods 604 or uplink (i.e., TX) periods 606 that are equivalent to multiples of Bluetooth slots in length. In the particular example illustrated, each 4G radio frame 602 consists of the downlink period 604 that is 3125 us long, which is equivalent to five BT slots in length, and the uplink period 606 that is 1875 us long, which is equivalent to three BT slots in length. In order to align communications in collocated WiFi and BT radios with those of the 4G radio, a 4G frame synchronization input signal 608 may be generated as illustrated. Notably, the RX portion of the 4G frame synchronization input signal 608 may be arranged to coincide with the portion of each 4G radio frame 602 that contains downlink period 604, and the TX portion of the 4G frame synchronization input signal 608 may be arranged to coincide with the portion of each 4G radio frame 602 that contains uplink period 606. In the example illustrated, the respective RX and TX portions may be 3.125 ms and 1.875 ms, respectively.

In various embodiments, the real-time frame synchronization module 216 may derive a Frame_Sync signal 610 based on the 4G frame synchronization input signal 608. The Frame_Sync signal 610 is then is received by both a BT and a WiFi radio module (not shown). Turning now to WiFi synchronization, in various embodiments, a co-located WiFi radio may control its transmissions to align with the TX portion 610b and control its receptions to align with the RX portion 610a. A WiFi radio may follow random channel access with slotted operations to initiate its transmissions. Depending on the mode (802.11 a/n/g/n), the slot size of WiFi radio may be either 9 μs or 20 μs. In both cases, the slot duration of a WiFi radio exhibits a much smaller time granularity compared with the frame duration of the 4G radio to which the WiFi radio is to align communications. Therefore, in various embodiments, a co-located WiFi radio can control its transmissions to align with the TX portion 610b following current 802.11 standards. In some embodiments, in order to control its receptions to align with the RX portion 610a, a WiFi radio may utilize CTS (clear-to-send)-to-self or Notification of Absence defined in IEEE 802.11v to notify the remote WiFi device when it is available for reception.

As further illustrated in FIG. 6, in response to the frame synchronization signal 610, the WiFi module may arrange its transmit and receive operations to take place in a regular fashion that is delineated by the frame synchronization signal. In particular, the WiFi module may alternate uplink and downlink communications to coincide with the TX portion 610b and RX portion 610a of the frame synchronization signal 610, effectively, establishing communications "periods" 612 having the same duration as the 4G radio frame 602. As illustrated, during each communication period 612, a data RX period 614 may be reserved for a portion of the communication period 612 that ends at the instance in time $t_1$ corresponding to the end of RX portion 610a of the frame synchronization signal 610. In this manner, the TX portion 610b may commence immediately after the end of a data RX portion 614. Since TX portion 610b delineates the uplink transmission period 606 for the 4G radio, the initiation of the TX portion 610b allows the WiFi radio to transmit an acknowledgment message (ACK) 616 from the WiFi radio immediately after the data RX transmission ends. Accordingly, this facilitates the ability of the WiFi radio to schedule transmission of an acknowledgment message 616 in accordance with the 802.11 standard, which specifies immediate return of an acknowledgement message after the data receive period ends, while ensuring that the acknowledgment message transmission coincides with the transmit portion of the 4G radio frame 602. Thus, the data receive/acknowledgement transmit protocol of IEEE 802.11 can be preserved while avoiding any transmit/receive collisions between WiFi and 4G radios.

Similarly to the RX data procedures, during each communication period 612, a data TX transmission 618 may be reserved for a portion of the communication frame that ends at the instance in time $t_2$ corresponding to the end of TX portion 610b of the frame synchronization signal 610. In this manner, the RX portion 610a may commence immediately after the end of a data transmission 618. Since RX portion 610a delineates the downlink period 606 for the 4G radio, the initiation of the RX portion 610a allows the WiFi radio to receive an acknowledgment message (ACK) 620 immediately after the data TX transmission 618 ends. Accordingly, this facilitates the ability of the WiFi radio to receive an acknowledgment message 620 in accordance with the 802.11 standard, which specifies immediate return of an acknowledgement message after the data transmit period ends, while ensuring that the acknowledgment message receipt coincides with the receive portion of the 4G radio frame 602. Thus, the data receive/acknowledgement transmit protocol of IEEE 802.11 can be preserved while avoiding any transmit/receive collisions between WiFi and 4G radios.

Since the WiFi radio may transmit and/or receive one frame every 5 ms, and given a typical WiFi transmission opportunity (TXOP) size of 1 ms~1.5 ms, and further assuming typical 4G DL and UL durations, the WiFi transmission and receiving throughput may range between 20%~30% of the full bandwidth when there is no co-located radio interference. More specifically, when a WiFi radio operates at 802.11n 2×2 mode, the maximum throughput is around 80 Mbps. At 20%~30% of the full bandwidth, the co-located WiFi radio can achieve 16~24 Mbps for transmission and receiving throughput.

Considering now the synchronization of collocated Bluetooth and 4G radios, as detailed in the use cases illustrated in FIG. 6, in various embodiments, the co-located BT radio may synchronize its clock with the frame synchronization signal 610, such that its slot boundary (master-to-slave slot or slave-to-master slot) aligns with reference timing provided by the frame synchronization signal 610. For example, a rising edge 610c of the frame synchronization signal 610 may be used by the BT radio to align its clock. Additionally, operations of the BT radio may be adjusted to not transmit during RX portions 610a, and may be operable to cease a transmission if already started. In other words, the BT radio operations may be adjusted to only transmit during TX portions 610b. Consistent with various embodiments, when a packet transmission is stopped in the middle of the transmission, the Bluetooth radio may treat the stopped transmission as a failed transmission and shall schedule its retransmission.

Turning now to the first Bluetooth usage case illustrated in FIG. 6, there is shown an example of Bluetooth keyboard/mouse usage in which a Bluetooth radio only periodically wakes up at specified sniff anchor points for data transmission and reception. The period between sniff anchor points is called a Sniff Interval, which can be negotiated when setting up the sniff mode. When properly configuring the sniff interval 624 based upon a frame synchronization signal (Frame_Sync signal) 610, all sniff anchor points can be usable by the co-located Bluetooth radio in the embodiment illustrated in FIG. 6. In the example illustrated, each sniff interval 624 has the same duration (5 ms) as one period of the frame synchronization signal 610. However, each sniff interval 624 begins before an RX portion 610a of frame synchronization signal 610 with an offset of 625 µs, equivalent to the duration of one BT slot. The co-located BT is assumed to have the master role. This allows for transmitting from a BT radio a transmit packet 626 in a slot of a sniff interval 624 that aligns with the TX portion 610b designated by the frame synchronization signal 610, while receiving a response packet 628 by the BT radio in the required next slot, such that the next slot that receives the response packet 628 is aligned with the RX portion 610a of the frame synchronization signal 610. In the specific example illustrated, the sniff interval is shown as 5 ms in duration. However, when the 4G radio frame period is 5 ms as illustrated, the sniff interval can be set to either 10 ms or 15 ms to ensure all sniff anchor points are usable for the Bluetooth radio. Such configuration of sniff mode can support typical refresh rates of a Bluetooth keyboard and mouse (up to 100 Hz, i.e., 1 packet exchange every 10 ms).

Continuing with the Bluetooth usage scenarios of FIG. 6, there is also shown an example of stereo audio streaming over Bluetooth. Bluetooth audio streaming profile implementations typically send one audio packet every 20 ms, 25 ms or 30 ms (which is termed a "packet inter-arrival time"). As illustrated in FIG. 6, a BT radio module serving as audio streaming source may arrange an audio streaming interval 630 to coincide with the frame synchronization period of the frame synchronization signal 610, defined by one RX portion 610a followed by a TX portion 610b. Thus, the duration of the audio streaming interval 630 may be 5 ms. In each audio streaming interval 630, an audio TX packet 632 may be arranged in the last three slots of the audio streaming interval 630, which facilitates the ability to receive a return communication packet 634 in the next BT slot subsequent to completion of transmission of the audio TX packet 632. As illustrated, the reception of RX packet 634 is aligned to lie within an interval delineated by the RX portion 610a, thereby ensuring that reception at the BT radio occurs during a time specified for reception for the 4G radio.

In order to maintain high quality stereo audio streaming, the maximum throughput requirement may be three 3-slot packet transmissions every 20 ms based on typical implementations of the Bluetooth audio streaming profile. Using the illustrated embodiment, a co-located Bluetooth radio can transmit one 3-slot packet corresponding to TX packet 632, every 5 ms, as shown in FIG. 6. This rate of transmission (equivalent to three 3-slot packet transmissions every 15 ms) exceeds the maximum throughput requirement of high quality stereo audio streaming usage of three 3-slot packet transmissions every 20 ms.

In the hands-free voice usage scenario illustrated, a Bluetooth radio module may arrange communications in periods defined by extended synchronous connection oriented (eSCO) packet transmission. An eSCO link defines a pair of reserved slots (mater-to-slave slot and slave-to-master slot)

that occur at regular intervals termed $T_{eSCO}$. In particular embodiments represented by FIG. 6, Bluetooth communications may be arranged in regular eSCO intervals that are designated as $T_{eSCO}$ intervals 640. In addition, the eSCO link may have a retransmission window $W_{eSCO}$ that occurs after the reserved slots. $T_{eSCO}$ and $W_{eSCO}$ may be negotiated between master and slave when the eSCO link is established.

FIG. 6 illustrates one example of optimizing BT hands-free voice communications in conjunction with a collocated active 4G radio. As illustrated in FIG. 6, $T_{eSCO}$=6 slots. In the first $T_{eSCO}$ period 640a, a packet 642 may be transmitted in slot 1, which corresponds to a TX portion defined by the frame synchronization signal 610. A packet 643 can then be received in slot 2 of the first $T_{eSCO}$ period 640a, which corresponds to an RX period defined by the frame synchronization signal 610. A subsequent packet 644 may be transmitted in the first slot 1 of the following $T_{eSCO}$ period 640b, which corresponds to a TX portion of the frame synchronization signal 610. However, in the subsequent slot 2 of $T_{eSCO}$ period 640b, a packet 646 may not be properly received due to possible collision with data in the 4G uplink transmission period 606. In the slot 3 of $T_{eSCO}$ period 640b, a transmission packet 648 polling the other BT device may be sent successfully, since this slot 3 corresponds to a TX portion of the frame synchronization signal 610. In the subsequent slot 4 of the $T_{eSCO}$ period 640b, a return packet may be successfully received since the slot 4 corresponds to an RX portion 610a of the frame synchronization signal 610, thereby ensuring that no collisions should take place with outgoing data from the 4G radio.

In a subsequent $T_{eSCO}$ period 640c, a data packet 652 may be successfully received in the slot 2 accorded for receiving data, since this slot corresponds to an RX portion 610a of the frame synchronization signal 610. In the next slot 3, a transmission of a data packet 654 may be successful since the slot 3 corresponds to a TX portion of the frame synchronization signal 610. In a subsequent slot 4, an acknowledgement packet 656 may be unsuccessfully received since the slot 4 corresponds to a TX portion 610b of the frame synchronization signal 610 and may therefore incur collision with data transmitted in the 4G uplink TX period 606.

However, to account for this, in the subsequent slot 5 of the $T_{eSCO}$ period 640c, a retransmission data packet 658 containing the originally transmitted data packet 654 may be sent. In the subsequent slot 6, an acknowledgement packet 660 may be successfully received since the slot 6 corresponds to an RX portion 610a of the frame synchronization signal 610.

In a subsequent $T_{eSCO}$ period 640d, a data packet 662 may be successfully received in the slot 2 accorded for receiving data, since this slot corresponds to an RX portion 610a of the frame synchronization signal 610. In the slot 5, a transmission of a data packet 664 may be successful since the slot 3 corresponds to a TX portion 610b of the frame synchronization signal 610. In a subsequent slot 6, an acknowledgement packet 666 may be unsuccessfully received since the slot 6 corresponds to a TX portion 610b of the frame synchronization signal 610 and may therefore incur collision with data transmitted in the 4G TX slots 606 or may incur collision with transmitted WiFi data packets 618. In a subsequent slot 1 of a following $T_{eSCO}$ period, a new data packet 668 may be transmitted from the BT device, which represents new data, since the data in data packet 664 may not be retransmitted when the corresponding $T_{eSCO}$ period ends. As such, loss of acknowledge packet will not cause deadlock (i.e., endless retransmissions of the same data packet).

For typical configurations, $T_{eSCO}$=6 slots, $W_{eSCO}$=4 slots, or $T_{eSCO}$=12 slots, $W_{eSCO}$=4 slots, Table 1 gives the performance achieved by BT frame synchronization procedures arranged according to the present embodiments. The term "Otherwise ideal channel condition" refers to the condition that co-located interference is the only source of causing receiving packet error.

TABLE 1

| | eSCO period TeSCO = 6 | eSCO periodTeSCO = 12 |
|---|---|---|
| eSCO packets delivered under otherwise ideal channel condition | 100% | 100% |
| Chances for recovering from lossy channel | 1 retransmission opportunity every four packets | 1 retransmission opportunity every two packets |

Thus, in the presence of an active 4G radio, as well as active WiFi radio, the present embodiments provide for up to 100% delivery of transmitted BT eSCO packets, and for varying frequency of retransmission opportunities to recover from a lossy channel depending on the eSCO period.

As evident from the aforementioned use cases disclosed in FIG. 6, the present embodiments provide for coexistence of three or more different simultaneously-active and co-located radios. Exemplary apparatus covered by the present embodiments include, for instance, a wireless device having a WiFi, BT, and LTE radio, or a wireless device having a WiFi, BT, and WiMAX radio. By employing the 4G_Frame_Sync signal to provide timing for communications employed by three different radios, each radio is constrained to transmit during the same (TX) period as each other radio, and is generally constrained to receive during the same (RX) period as each other radio. The present embodiments support effective communications for many different BT uses, including the use of a BT for handsfree audio, for stereo audio streaming and for keyboard and mouse, when the BT radio is colocated in a multi-radio device that has an active WiFi radio and an active 4G radio at the same time.

Figure 7:
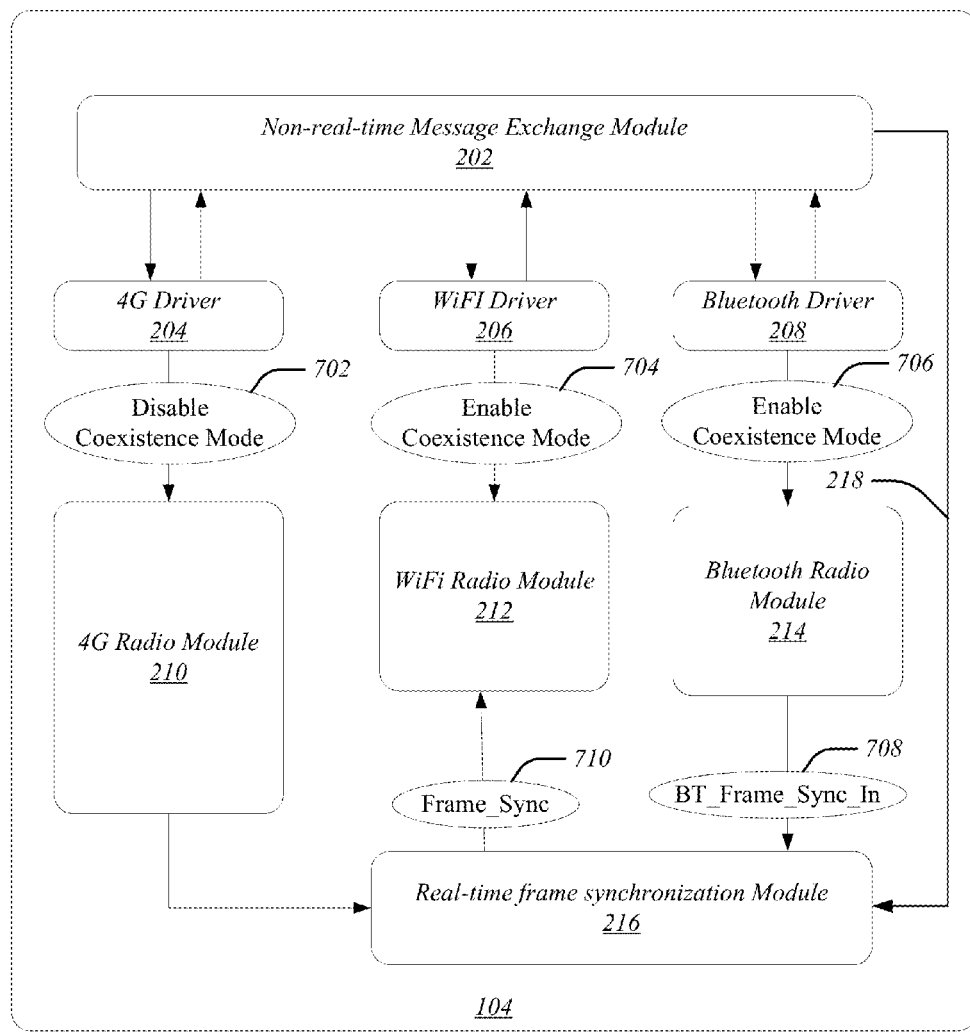
FIG. 7 depicts general features of signaling for multi-radio synchronization when a 4G radio is inactive according to further embodiments.

Turning once more to FIG. 2, consistent with further embodiments, the architecture of multi-radio platform 102 may be used when the 4G radio module 210 is not active to improve communications between remaining active devices. For example, WiFi and Bluetooth coexistence can be enabled using the real-time frame synchronization module 216. FIG. 7 depicts general features of signaling in the case where a 4G radio is inactive according to some embodiments. When the 4G radio module 210 is inactive, no control signal, such as a 4G_Frame_Sync_In signal may be sent from the 4G radio module 210. In some cases, the 4G driver 204 may send a disable coexistence mode signal to the 4G radio module 210. This may prevent or cease the transmission of a 4G_Frame_Sync_In message from the 4G radio module 210. As further illustrated in FIG. 7, WiFi driver 206 may send an enable coexistence mode message 704 to WiFi radio module 212, and BT driver 208 may send an enable coexistence mode message 706 to BT radio module 214. Because the 4G radio module is inactive, the non-real time message exchange module 202 may alert the BT radio module 214 as to the status of the 4G radio module, so that the BT radio module 214 may be triggered to output a frame synchronization input message (BT_Frame_Sync_In) 708, which may be used by the real-time frame synchronization module 216 to generate control signals. In particular, the real-time frame synchronization module 216 may output a frame synchronization message 710 based upon the frame synchronization input message 708 to adjust operation of the WiFi radio module 212 in order to avoid collisions between WiFi and BT radios.

Figure 8:
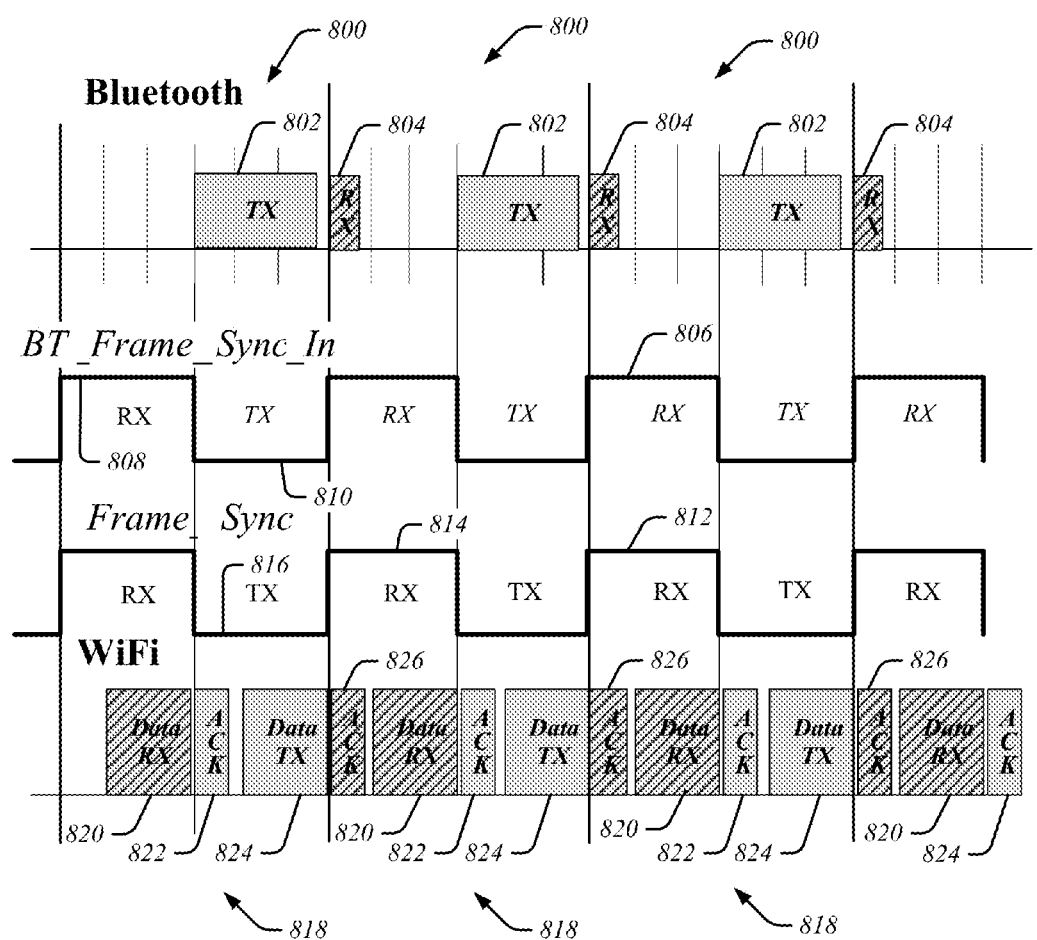
FIG. 8 illustrates one scenario for frame synchronization between BT and WiFi radios consistent with some embodiments.

FIG. 8 illustrates one scenario for frame synchronization between BT and WiFi radios consistent with some embodiments. A series of BT frames 800 include 6 slots apiece, in which the last three slots may support transmission of a data packet 802, which is followed by reception of a data packet 804 in the first slot of each subsequent BT frame 800. Notably, although referred to using the same reference number, the content of each data packet 802 may differ among the data packets. The transmission and reception of the data packets may be employed by a BT radio module 214 to generate the exemplary frame synchronization input signal (BT_Frame_Sync_In) 806, which includes alternating RX portions 808 and TX portions 810, characterized by respective high and low signals. In some embodiments, the duration of RX portions 808 may be the same as the duration of TX portions 810. The frame synchronization module 216 may determine that the WiFi operation is to be aligned based solely on the frame synchronization input signal (BT_Frame_Sync_In) 806 received from the BT radio module 214, in which case the frame synchronization module 216 may replicate the frame synchronization input signal 806 as a frame synchronization signal 812, which is output to the WiFi radio module 212.

In response, the WiFi radio module may arrange its receptions to coincide with the receiving duration 814 indicated by the frame synchronization signal 812, and arrange its transmissions to coincide with the transmission duration 816 indicated by the frame synchronization signal 812. As illustrated, a series of data packets 820 may be received such that reception terminates at the end of frame synchronization signal RX portion 814. (Again, the reference numbers 820, 822, 824, and 826 each refer to a respective series of data packets in which the content may vary between different members of the series. Thus, two different data packets identified by "820" may have different content.) This allows acknowledgment messages 822 to be transmitted from the WiFi radio immediately following the reception of data packets 820, since the subsequent transmission of acknowledgment messages 822 takes place during frame synchronization signal TX portion 816. Accordingly, the acknowledgment messages 822 may be transmitted at the appropriate time in consonance with the WiFi standard, while ensuring that the transmissions do not occur when data is being received by the BT device (i.e., the periods specified by the RX portions 814 of the frame synchronization signal 812).

As further illustrated in FIG. 8, a series of data packets 824 may be transmitted in portions of the WiFi frame such that transmission terminates at the period defined by frame synchronization signal TX portions 816. This allows acknowledgment messages 826 to be received by the WiFi radio immediately following the transmission of data packets 824, since the subsequent reception of acknowledgment messages 826 takes place during frame synchronization signal RX portion 814. Accordingly, the acknowledgment messages 826 may be transmitted at the appropriate time in consonance with the WiFi standard, while ensuring that the receptions do not occur when data is being transmitted by the BT device, that is, during periods specified by the TX portions 816 of the frame synchronization signal 812.

In some embodiments, the duration of RX portion 814 and TX portion 816 may be arranged according to the following constraints. The duration of TX portion 816 may be greater than the min_tx_duration for the WiFi transmissions, which denotes the minimum time to transmit an aggregate frame. The duration of RX portion 814 may be greater than the min_rx_duration for the WiFi transmissions, which denotes the minimum time to receive an aggregate frame. Furthermore, the min_tx_duration and min_rx_duration may also be specified to be less than 4×0.625 ms=2.5 ms, to ensure latency requirements of common Bluetooth and WiFi usages. Operating under these constraints, the RX portion 814 and TX portion 816 may each be set to 1.875 ms, which is the equivalent of three BT slots and satisfies the latency requirements for common usages, while providing a min_tx_duration and min_rx_duration that is sufficient for transmission and reception of a WiFi aggregate frame. Accordingly, if, at any instance, a frame synchronization signal that is output by a frame synchronization module does not satisfy the aforementioned constraints, the frame synchronization signal may be modified until it does meet the constraints. That is, the output signal 812 of the real-time frame synchronization module 216 may be a variation of the frame synchronization input signal 806 such that the aforementioned constraints are met.

It is to be noted that the 4G synchronization apparatus and procedures disclosed herein apply to 3GPP LTE radios as well as WiMAX radios. In particular, even though the 3GPP LTE frame structure consists of 500 µs subframes, the special subframe #1 or #6 is designed to support flexible division of uplink and downlink portions. All frame configurations specified by 3GPP have LTE frame periodicity of either 5 ms or 10 ms, which satisfies a key condition for the present embodiments to be effective. In particular, the present embodiments support any frame configuration of LTE or WiMAX that has a downlink-to-uplink ratio larger than 1:1.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
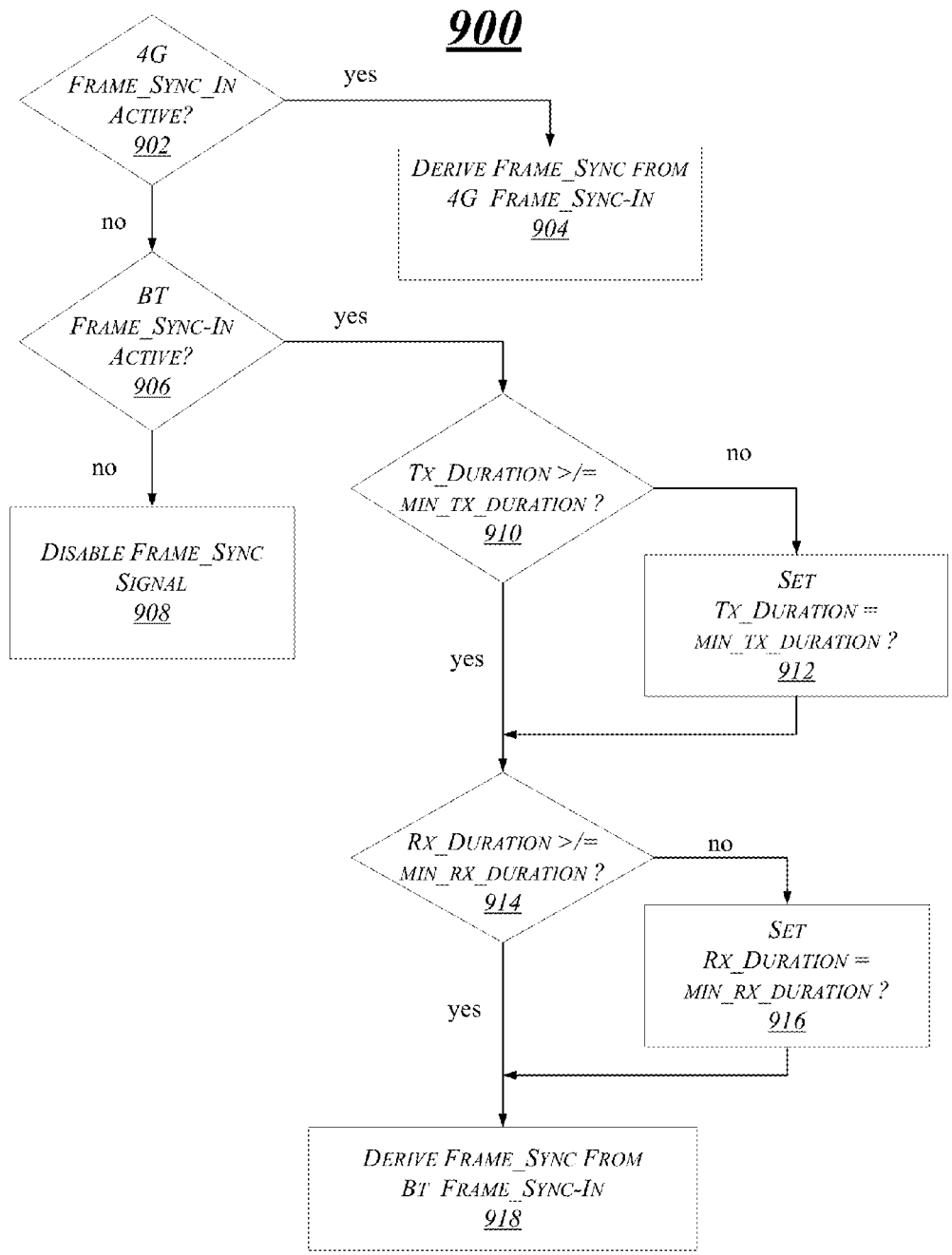
FIG. 9 depicts one exemplary logic flow.

FIG. 9 depicts one exemplary logic flow 900. At block 902, a determination is made as to whether a 4G Frame_Sync_In signal (frame synchronization input signal) is active. If so, the flow moves to block 904, where a Frame_Sync signal (frame synchronization signal) for controlling synchronization of non-4G radios is derived from the 4G Frame_Sync_In signal. If not, the flow moves to block 906.

At block 906, a determination is made as to whether a BT Frame_Sync_In signal is active. If not, the flow moves to block 908, where the Frame_Sync signal is disabled. If so, the flow moves to block 910.

At block 910, a determination is made as to whether a TX portion of the Frame_Sync signal is greater than or equal to a min_tx duration that specifies a minimum time for transmitting in a WiFi radio. If not, the flow moves to block 912. At block 912 the TX portion of the Frame_Sync signal is set to equal the min_tx duration If, at block 910, the TX portion is determined to be at least equal to min_tx_duration, the flow moves to block 914.

At block 914, a determination is made as to whether a RX portion of the Frame_Sync signal is greater than or equal to a min_rx duration that specifies a minimum time for transmitting in a WiFi radio. If not, the flow moves to block 916. At block 916 the RX portion of the Frame_Sync signal is set to equal the min_tx duration.

If, at block 914, the RX portion is determined to be at least equal to min_rx_duration, the flow moves to block 918. At block 918 a Frame_Sync signal for controlling synchronization of non-4G radios is derived from the BT Frame_Sync_In signal.

Figure 10:
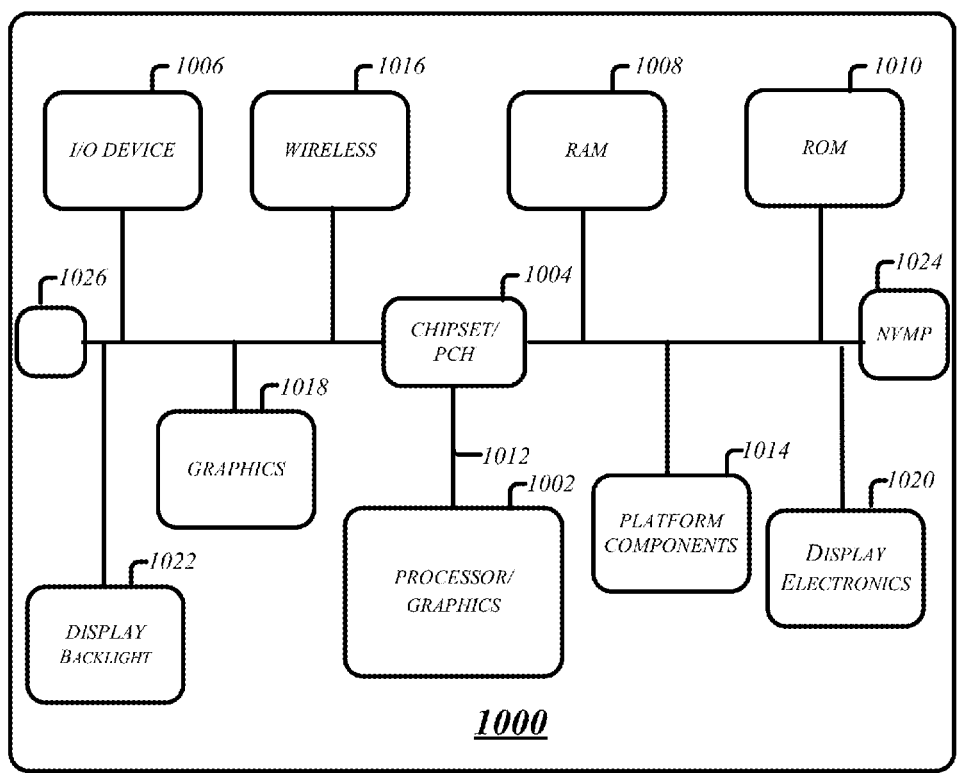
FIG. 10 depicts an embodiment of a computing system.

FIG. 10 is a diagram of an exemplary system embodiment and in particular, FIG. 10 is a diagram showing a platform 1000, which may include various elements. For instance, FIG. 10 shows that platform (system) 1010 may include a processor/graphics core 1002, a chipset/platform control hub (PCH) 1004, an input/output (I/O) device 1006, a random access memory (RAM) (such as dynamic RAM (DRAM)) 1008, and a read only memory (ROM) 1010, display electronics 1020, display backlight 1022, and various other platform components 1014 (e.g., a fan, a crossflow blower, a heat sink, DTM system, cooling system, housing, vents, and so forth). System 1000 may also include wireless communications chip 616 and graphics device 1018. The embodiments, however, are not limited to these elements.

As shown in FIG. 10, I/O device 1006, RAM 1008, and ROM 1010 are coupled to processor 1002 by way of chipset 1004. Chipset 1004 may be coupled to processor 1002 by a bus 1012. Accordingly, bus 1012 may include multiple lines.

Processor 1002 may be a central processing unit comprising one or more processor cores and may include any number of processors having any number of processor cores. The processor 1002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1002 may be multiple separate processors located on separate integrated circuit chips. In some embodiments processor 1002 may be a processor having integrated graphics, while in other embodiments processor 1002 may be a graphics core or cores.

Figure 11:
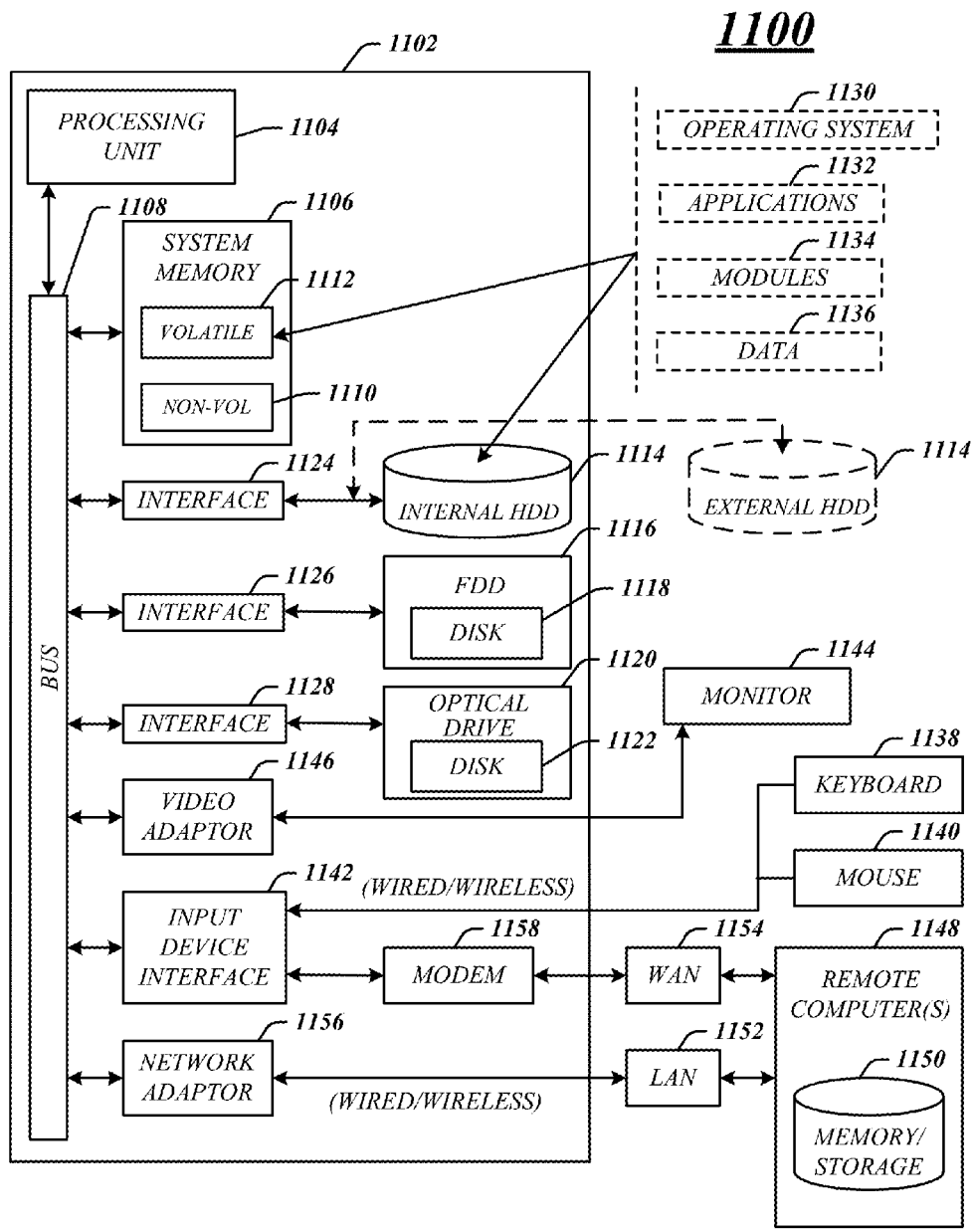
FIG. 11 illustrates one embodiment of a computing architecture.

FIG. 11 illustrates an embodiment of an exemplary computing system (architecture) 1100 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE- PROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1112, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1194 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1294 serial port, a game port, a USB port, an IR interface, and so forth.

A monitor 1144 or other type of display device is also connected to the system bus 1208 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
    a set of co-located transceivers comprising three or more transceivers each operable to communicate via a wireless communications standard different from each other transceiver;
    a driver to output an enable signal when a first transceiver of the set of co-located transceivers is active, the enable signal to cause the first transceiver to output a first frame synchronization input signal; and
    a real-time frame synchronization module operable on a processor circuit to receive the first frame synchronization input signal to delineate first receive and first transmit periods of a radio frame of the first transceiver, and generate a frame synchronization signal to align receive and transmit periods of each of a multiplicity of additional transceivers of the set of co-located transceivers to the respective first receive and first transmit periods of the first transceiver such that the respective receive periods of the multiplicity of additional transceivers comprise durations matching a duration of the first receive period and the respective transmit periods of the multiplicity of additional transceivers comprise durations matching a duration of the first transmit period, the alignment to reduce interference between communications of the first transceiver and communications of the multiplicity of additional transceivers.

2. The apparatus of claim 1, the first transceiver comprising a wireless wide area network (WWAN) transceiver, and the multiplicity of additional transceivers comprising a wireless local area network (WLAN) transceiver and a wireless personal area network (WPAN) transceiver.

3. The apparatus of claim 1, the first transceiver comprising a Worldwide Interoperability for Microwave Access (WiMAX) transceiver or a 3GPP LTE-A (LTE 4G) transceiver, and the multiplicity of additional transceivers comprising an IEEE 802.11 transceiver and a Bluetooth (BT) transceiver.

4. The apparatus of claim 1, comprising a non-real-time message exchange module operable on the processor circuit to exchange radio frame information among at least two of the three or more transceivers.

5. The apparatus of claim 1, the processor circuit operable to schedule the first transceiver for data reception and transmission over a first time division duplex frame comprising a 5 millisecond (ms) or a 10 ms frame duration.

6. The apparatus of claim 1, the frame synchronization signal comprising a rising edge that is coincident with a start of a radio frame of the first transceiver and operable to align operations of an additional transceiver with a time reference of the first transceiver.

7. The apparatus of claim 1, the frame synchronization signal comprising a first trailing edge that that is coincident with an end of the receive period or an end of the transmit period of the first transceiver.

8. The apparatus of claim 1, the frame synchronization signal comprising:
    a reference timing coincident with a start of a radio frame of the first transceiver;
    a receive (Rx) portion comprising a first signal level and spanning a first interval corresponding to a receive period of the radio frame of the first transceiver; and
    a transmit (Tx) portion comprising a second signal level and spanning a second interval corresponding to a transmit period of the radio frame of the first transceiver.

9. The apparatus of claim 1, comprising a housing that contains the three or more transceivers.

10. A method, comprising:
    activating a first transceiver comprising a wireless wide area network (WWAN) transceiver when data is to be transmitted or received by the first transceiver;
    generating a first enable signal while the first transceiver is active;
    generating a first frame synchronization input signal that delineates first receive and first transmit periods of the first transceiver; and
    outputting a frame synchronization output signal based upon the first frame synchronization input signal to align receive and transmit periods of each of a multiplicity of additional transceivers to the respective first receive and first transmit periods of the first transceiver such that the respective receive periods of the multiplicity of additional transceivers comprise durations matching a duration of the first receive period and the respective transmit periods of the multiplicity of additional transceivers comprise durations matching a duration of the first transmit period, each of the multiplicity of additional transceivers arranged to communicate via a communications standard different from each other transceiver, the alignment to allow substantially simultaneous transmission or substantially simultaneous reception between the first transceiver and the multiplicity of additional transceivers.

11. The method of claim 10, comprising generating the frame synchronization output signal as a rising edge that is coincident with a start of a radio frame of the first transceiver and a start of a radio slot of an additional transceiver.

12. The method of claim 10, comprising generating the frame synchronization output signal as a first trailing edge that that is coincident with an end of the receive period or an end of the transmit period of the first transceiver.

13. The method of claim 10, comprising providing the frame synchronization output signal as a periodic signal comprising a transmit portion having a transmit duration that is longer than a minimum transmit interval for transmission of one aggregate frame.

14. The method of claim 10, comprising providing the frame synchronization output signal as a periodic signal comprising a receive portion having a receive duration that is longer than a minimum receive interval for reception of one aggregate frame.

15. At least one non-transitory computer-readable storage medium comprising a plurality of instructions that, when executed, cause a system to receive a first frame synchronization input signal to delineate first receive and first transmit periods of a radio frame of a first transceiver, and generate a frame synchronization signal to align receive and transmit periods of each of a multiplicity of additional transceivers of a set of co-located transceivers to the respective first receive and first transmit periods of the first transceiver such that the respective receive periods of the multiplicity of additional transceivers comprise durations matching a duration of the first receive period and the respective transmit periods of the multiplicity of additional transceivers comprise durations matching a duration of the first transmit period, the alignment to reduce interference between communications of the first transceiver and communications of the multiplicity of additional transceivers.

16. The at least one non-transitory computer-readable storage medium of claim 15 comprising instructions that, when executed, cause a system to exchange radio frame information among at least two of three or more transceivers.

17. The at least one non-transitory computer-readable storage medium of claim 15 comprising instructions that, when executed, cause a system to schedule the first transceiver for data reception and transmission over a first time division duplex frame comprising a 5 millisecond (ms) or a 10 ms frame duration.

18. The at least one non-transitory computer-readable storage medium of claim 15 comprising instructions that, when executed, cause a system to generate the frame synchronization signal as a rising edge that is coincident with a start of a radio frame of the first transceiver and a start of a radio slot of an additional transceiver.

19. The at least one non-transitory computer-readable storage medium of claim 15 comprising instructions that, when executed, cause a system to generate the frame synchronization signal as a first trailing edge that that is coincident with an end of the receive period or an end of the transmit period of the first transceiver.

20. The at least one non-transitory computer-readable storage medium of claim 15 comprising instructions that, when executed, cause a system to provide the frame synchronization output signal as a periodic signal comprising a transmit portion having a transmit duration that is longer than a minimum transmit interval for transmission of one aggregate frame.

* * * * *